(12) United States Patent
Kashimoto

(10) Patent No.: US 8,722,958 B2
(45) Date of Patent: May 13, 2014

(54) METHOD OF DECOMPOSING WASTE PLASTIC/ORGANIC MATERIAL USING TITANIUM OXIDE GRANULE WITH OPTIMAL PARTICLE PROPERTY

(75) Inventor: Itsushi Kashimoto, Kusatsu (JP)

(73) Assignee: Kusatsu Electric Co., Ltd., Shiga (JP)

( * ) Notice: Subject to any disclaimer, the term of this patent is extended or adjusted under 35 U.S.C. 154(b) by 572 days.

(21) Appl. No.: 13/059,755

(22) PCT Filed: Aug. 18, 2009

(86) PCT No.: PCT/JP2009/003927
§ 371 (c)(1),
(2), (4) Date: Apr. 5, 2011

(87) PCT Pub. No.: WO2010/021122
PCT Pub. Date: Feb. 25, 2010

(65) Prior Publication Data
US 2011/0178358 A1  Jul. 21, 2011

(30) Foreign Application Priority Data
Aug. 20, 2008  (JP) ................................. 2008-211726

(51) Int. Cl.
*A62D 3/38* (2007.01)
(52) U.S. Cl.
USPC ............ 588/405; 585/241; 201/2.5; 588/313; 588/314; 588/315; 588/316; 588/321
(58) Field of Classification Search
USPC .................. 588/313–316, 321, 405; 585/241; 201/2.5
See application file for complete search history.

(56) References Cited

U.S. PATENT DOCUMENTS

| | | |
|---|---|---|
| 4,584,421 A | 4/1986 | Saito et al. |
| 5,116,582 A | 5/1992 | Cooper et al. |
| 5,387,734 A | 2/1995 | Hagenmaier et al. |

(Continued)

FOREIGN PATENT DOCUMENTS

| | | | |
|---|---|---|---|
| CA | 2703036 | * 4/2009 | ............... C08J 11/16 |
| JP | 57-178719 A | 11/1982 | |

(Continued)

OTHER PUBLICATIONS

Miller, S.A. et al. (1984).Perry's Chemical Engineers' Handbook, 5th ed, Section 19, McGraw-Hill (Office action references p. 19-8).*

(Continued)

*Primary Examiner* — Brian McCaig
(74) *Attorney, Agent, or Firm* — Kilyk & Bowersox, P.L.L.C.

(57) ABSTRACT

Provided is a method of decomposing plastic and organic waste by using titanium oxide granules which are easily separated from metals and inorganic substances, have a highly efficient decomposing capability, and have a characteristic of fine powder formation resistance during pyrolysis. More specifically, the method of decomposing plastic and organic waste by using titanium oxide granules which are easily separated from metals and inorganic substances, have a highly efficient decomposing capability, and have a characteristic of fine powder formation resistance during pyrolysis has been established by optimizing the characteristics of titanium oxide granules.

5 Claims, 6 Drawing Sheets

(56) References Cited

U.S. PATENT DOCUMENTS

| | | |
|---|---|---|
| 5,480,524 A | 1/1996 | Oeste |
| 5,608,136 A | 3/1997 | Maezawa et al. |
| 5,810,920 A | 9/1998 | Ueshima et al. |
| 5,849,201 A | 12/1998 | Bradley |
| 6,063,343 A | 5/2000 | Say et al. |
| 6,090,736 A | 7/2000 | Taoda et al. |
| 6,270,630 B1 | 8/2001 | Xing |
| 6,288,300 B1 | 9/2001 | Lemus et al. |
| 6,383,980 B1 | 5/2002 | Hagihara et al. |
| 6,498,000 B2 | 12/2002 | Murasawa et al. |
| 6,524,447 B1 | 2/2003 | Carmignani et al. |
| 6,888,041 B1 | 5/2005 | Nakamura |
| 7,034,198 B2 | 4/2006 | Osada et al. |
| 7,691,344 B2 | 4/2010 | Yoshimura |
| 7,776,284 B2 | 8/2010 | Kitamura et al. |
| 7,862,691 B2 | 1/2011 | Kitamura et al. |
| 2004/0073078 A1 | 4/2004 | Osada et al. |

FOREIGN PATENT DOCUMENTS

| | | |
|---|---|---|
| JP | 10-95984 A | 4/1998 |
| JP | 2002-167467 A | 6/2002 |
| JP | 2003-334529 A | 11/2003 |
| JP | 2004-182837 A | 7/2004 |
| JP | 2005-139440 A | 6/2005 |
| JP | 2005-187794 A | 7/2005 |
| JP | 2005-205312 A | 8/2005 |
| JP | 2005-307007 A | 11/2005 |
| JP | 2007-8092 A | 1/2007 |
| WO | 01/05908 A1 | 1/2001 |

OTHER PUBLICATIONS

International Search Report from PCT/JP2009/003927, Nov. 10, 2009, two pages.
International Preliminary Report on Patentability from PCT/JP2009/003927, Mar. 8, 2011, six pages.

* cited by examiner

A

B

C

A

B

C 0.7g/min 1.5g/min 2.0 g/min

METHOD OF DECOMPOSING WASTE PLASTIC/ORGANIC MATERIAL USING TITANIUM OXIDE GRANULE WITH OPTIMAL PARTICLE PROPERTY

This application is a National Stage Application of PCT/JP2009/003927, filed Aug. 18, 2009, which claims priority of to Japanese Patent Application No. 2008-211726, filed Aug. 20, 2008, which are incorporated herein by reference.

TECHNICAL FIELD

The present invention relates to a method of decomposing plastic and organic waste, in particular, medical waste or infectious medical waste both including various kinds of plastics and organic substances, by using titanium oxide granules having optimal particle characteristics.

BACKGROUND ART

In recent years, there have been proposed various methods of treating and recycling plastic waste, and further, parts thereof have been practically employed. As a potent one of such methods of treating plastic waste, there has been proposed an apparatus and method involving gasifying the plastic waste by heating chips of the plastic waste in the presence of a decomposition catalyst of titanium oxide known as a photocatalyst (see Patent Literatures 1 and 2).

Further, catalysts used for decomposition treatment of the plastic waste chips have been variously studied (Patent Literatures 3 to 6).

On the other hand, regarding the prevention of secondary infection caused by infectious medical waste discharged from hospitals, dialysis facilities, and the like, a guideline specifying the treatment method of that kind of waste was issued from the Ministry of Health and Welfare on Nov. 7, 1989, and was enforced on Apr. 1, 1990. The guideline orders the hospitals, dialysis facilities, and the like to conduct in-house sterilization treatment of the medical waste, in principle.

In this regard, there is a demand for the development of a decomposition method, a decomposition apparatus, and a decomposition system each of which enables the treatment of plastic waste, in particular infectious medical waste containing polyvinyl chloride, in facilities such as hospitals and clinics safely without the need of a large scale apparatus.

CITATION LIST

Patent Literature

[PTL 1] JP 2002-363337 A
[PTL 2] JP 2004-182837 A
[PTL 3] JP 2005-066433 A
[PTL 4] JP 2005-205312 A
[PTL 5] JP 2005-307007 A
[PTL 6] WO 2007/122967 A1

SUMMARY OF INVENTION

Technical Problem

Conventionally used titanium oxide is apt to wear and is easily pulverized into fine powder. Thus, in the pyrolysis of plastic waste as described above, fine powder of titanium oxide is lost outside a reaction container in accompanying with gases generated by the pyrolysis, and hence pyrolysis efficiency becomes lower as time elapses, and moreover, the particle size distribution of titanium oxide granules changes as the titanium oxide granules are pulverized into fine powder. In view of the foregoing, the conventionally used titanium oxide has had a problem in that the pyrolysis efficiency of plastic waste becomes lower.

Further, conventional titanium oxide is not suitable for separating itself from metals and inorganic substances mixed with plastic waste to be treated, and hence the conventional titanium oxide has had a problem in that valuable metals and inorganic substances cannot be collected sufficiently.

Besides, the conventional titanium oxide has had a problem in that even if a titanium oxide catalyst having a larger particle size is used in order to prevent titanium oxide from pulverizing into fine powder, the pyrolysis efficiency of plastic waste is inferior.

In addition, when a conventional decomposition apparatus is used, a powdered and dispersing catalyst is wasted instead of being returned to a reaction tank. This is because a powdered catalyst has low flowability, and hence it becomes difficult for the powdered catalyst to mix with plastic and organic waste. This problem becomes more remarkable as the amount of a catalyst accumulating in a reaction tank increases, resulting in the prevention of the installation of a larger reaction tank and also resulting in the prevention of increasing the amount of waste to be treated.

That is, an object of the present invention is to provide, in order to solve the above-mentioned problems, a method of decomposing plastic and organic waste by using titanium oxide granules which are easily separated from metals and inorganic substances, have a highly efficient decomposing capability, and have a characteristic of fine powder formation resistance during pyrolysis.

Solution to Problem

The inventor of the present invention has made intensive studies to solve the above-mentioned problems. As a result, the inventor has established a method of decomposing plastic and organic waste at high efficiency by optimizing the characteristics of titanium oxide granules.

Consequently, the present invention has been finally completed.

That is, the present invention includes the following.

"1. A method of decomposing plastic and organic waste involving converting plastic and/or organic waste to gas, the method including the step of stirring while heating the plastic and/or organic waste in a range of 420° C. to 560° C. together with a catalyst formed of titanium oxide granules containing titanium oxide as an active component, in which the catalyst has the following characteristics:

(1) the granules each have a substantially spherical shape; and (2) granules each having a particle diameter of 0.2 mm to 1.0 mm account for 70% or more of all the granules.

2. A method of decomposing plastic and organic waste according to the item 1, wherein granules each having a particle diameter of 0.3 mm to 1.0 mm account for 70% or more of all the granules.

3. A method of decomposing plastic and organic waste according to the item 1 or 2, wherein the phrase "the granules each have a substantially spherical shape" comprises the following characteristics:

(1) an angle at which a granule first starts sliding is 0.5° to 15.0°; and (2) an angle at which all the granules finish sliding is 2.0° to 30.0°.

4. A method of decomposing plastic and organic waste according to any one of the items 1 to 3, wherein the granules each have a tap density in a range of 1.05 g/mL to 1.4 g/mL.

5. A method of decomposing plastic and organic waste according to any one of the items 1 to 4, wherein the granules each have a specific surface area in a range of 35 $m^2$/g to 50 $m^2$/g."

Advantageous Effects of Invention

The decomposition method of the present invention, the method using the titanium oxide granules having the optimal particle characteristics, has a several times higher capability of treating plastic and organic waste, compared with decomposition methods using conventional titanium oxide. Further, the titanium oxide granules that are used in the decomposition method of the present invention are easily separated from metals and inorganic substances, have a highly efficient decomposing capability, and have the characteristic of fine powder formation resistance during pyrolysis, compared with conventional titanium oxide.

DESCRIPTION OF EMBODIMENTS

Figure 1:
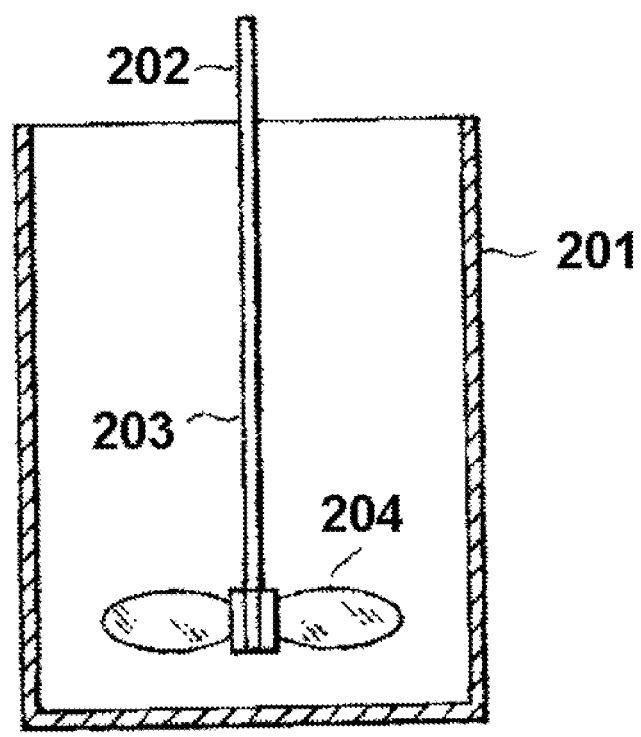
FIG. 1 is a view illustrating an apparatus for measuring the wear ratio of titanium oxide.

The "heating temperature of the catalyst" of the present invention is required to be at least 300° C. or more and 600° C. or less, preferably 350° C. or more, particularly preferably 420° C. to 560° C., still more preferably 450° C. to 530° C., most preferably 480° C. to 510° C.

Note that the heating temperature is a temperature in a reaction tank to cause the catalyst and plastic and/or organic waste to react with each other, and is a set temperature to keep the set temperature of the catalyst. That is, even when the set temperature is 480° C., the range of fluctuation of the catalyst temperature in the reaction tank becomes about 30° C. higher or lower than the set temperature.

Further, at a certain position in the reaction tank, the temperature may become higher or lower than the particularly preferred "heating temperature of the catalyst" of the present invention depending on the shape and size of the reaction tank. However, most part of the catalyst has only to maintain the preferred heating temperature of the catalyst.

A catalyst of the present invention is one formed of titanium oxide granules containing titanium oxide as an active component. Further, the catalyst formed of the titanium oxide granules is not limited to titanium oxide granules formed only of titanium oxide as the active component, and a mixture of titanium oxide with at least one kind selected from aluminum oxide and silicon oxide (hereinafter also referred to as inorganic oxide) is also permitted. Further, there is also included as the catalyst at least one kind of inorganic oxide selected from a composite oxide of titanium and niobium, a composite oxide of titanium and silicon, a composite oxide of titanium and at least one kind selected from silicon and tungsten, a composite oxide of titanium and at least one kind selected from silicon and molybdenum, a composite oxide of titanium and aluminum, zirconium oxide, a composite oxide of titanium and zirconium, and a titanium-containing perovskite compound.

Note that, of the inorganic oxides, examples of the titanium-containing perovskite compound include strontium titanate, barium zirconate titanate, and calcium titanate. In addition, there are also given products obtained by substituting part of barium, zirconium, strontium, and/or calcium in those compounds with lanthanum, cerium, yttrium, or the like, for example. However, the titanium-containing perovskite compound is not limited thereto.

In the method of decomposing plastic and organic waste of the present invention, by using a suitable catalyst under a heating condition, plastic and organic waste can be decomposed highly efficiently. In addition, the catalyst can be easily separated from metals, inorganic substances, and the like mixed with plastic waste.

The titanium oxide granules to be used in the method of decomposing plastic and organic waste of the present invention each have a "particle diameter" of 0.20 mm to 1.2 mm, preferably 0.30 mm to 1.0 mm, more preferably 0.40 mm to 1.0 mm, most preferably 0.40 mm to 0.80 mm.

More specifically, titanium oxide granules each having a particle diameter of 0.20 mm to 1.2 mm, preferably 0.3 mm to 1.0 mm, more preferably 0.40 mm to 1.0 mm, most preferably 0.40 mm to 0.80 mm account for 70% or more, preferably 80% or more, more preferably 90% or more of all titanium oxide granules before use.

Note that the above-mentioned ranges of the particle diameter of each of the granules are those obtained from the results of Example 2.

In addition, the main distribution of the particle diameters of titanium oxide before use is 0.4 mm to 0.6 mm, preferably about 0.50 mm.

Further, in order to decompose plastic and organic waste with which fine powders of metals and inorganic substances, in particular, of rare metals and the like are mixed, the above-mentioned "particle diameter" of each of the titanium oxide granules is 0.4 mm to 1.0 mm, preferably 0.5 mm to 0.8 mm, out of the above-mentioned ranges.

That is, the use of titanium oxide granules each having a larger particle diameter can enhance the collection ratio of finely powdered metals and inorganic substances.

The phrase "the granules each have a substantially spherical shape" in the present invention means that the surface of each of the granules (particles) is rounded off and the degree of spherical shape in particle shape is higher, compared with the shape of conventional titanium oxide catalysts.

Note that as indicators showing that the degree of spherical shape in particle shape is higher, there are exemplified a "circularity," a "slant angle for rolling of granules (particles)," and a "rest angle."

The "method of measuring a circularity" of the present invention can be carried out under the following condition and with the following apparatus.

(Condition)

A CCD camera is fixed to an inverted microscope, and the processing of images is performed with Image-Pro Plus. Specifically, titanium oxide granules are placed in a plastic petri dish so that the granules do not overlap with each other, images are taken into the inverted microscope described below at a magnification of four times, and the circularity of each granule is automatically measured by using Image-Pro Plus.
(Apparatus)
Microscope: inverted microscope TMD-300 Nikon Corporation,
CCD camera: Nippon Roper K. K., Retiga 2000R (1600× 1200 pixels)
Image processing apparatus: Nippon Roper K. K., Image-Pro Plus Note that the "circularity" of each of the titanium oxide granules that are used in the method of decomposing plastic and organic waste of the present invention is 1.00 to 2.00, preferably 1.00 to 1.50, more preferably 1.00 to 1.40, still more preferably 1.00 to 1.30, most preferably 1.00 to 1.20.

More specifically, titanium oxide granules each having a circularity of 1.00 to 2.00, preferably 1.00 to 1.50, more preferably 1.00 to 1.40, still more preferably 1.00 to 1.30, most preferably 1.00 to 1.20 account for 70% or more, preferably 80% or more, more preferably 90% or more of all titanium oxide granules before use.

Note that the above-mentioned ranges of the circularity of each of the titanium oxide granules are those obtained from the results of Example 2.

The "slant angle for rolling of granules" of the present invention can be measured under the following conditions.

20 g of titanium oxide granules are placed on a glass plate, and the angle of the glass plate is changed from horizontal (0°) to slanted, to thereby measure (1) the angle at which a titanium oxide granule first starts sliding and (2) the angle at which all titanium oxide granules finish sliding.

Note that the values of the "slant angle for rolling of granules" of the titanium oxide granules that are used in the method of decomposing plastic and organic waste of the present invention are as follows.
(1) The angle at which a granule first starts sliding is 0.5° to 15.0°, preferably 0.5° to 10.0°, more preferably 0.5° to 8.0°, most preferably 0.5° to 5.0°.
(2) The angle at which all granules finish sliding is 2.0° to 30.0°, preferably 2.0° to 25.0°, more preferably 2.0° to 22.0°, most preferably 2.0° to 18.0°.

The above-mentioned ranges of the "slant angle for rolling of granules" of the granules are those obtained from the results of Example 3.

The "rest angle" of the present invention can be measured by the following method.

20 g of unused titanium oxide granules are dropped with a funnel to form a mountain-like layer, and the angle between the slant of the layer and the horizontal plane is measured. Note that the rest angle of the layer of granules having better flowability is smaller, and in contrast, the rest angle of the layer of granules having worse flowability becomes larger.

Note that the "rest angle" of the titanium oxide granules that are used in the method of decomposing plastic and organic waste of the present invention is 15° to 35°, preferably 20° to 35°.

In addition, there is a "tap density" as another indicator showing characteristics of the titanium oxide granules that are used in the method of decomposing plastic and organic waste of the present invention.

Note that the tap density of the titanium oxide granules in the present invention can be measured as follows.

180 g of titanium oxide granules are loaded into a 200-mL graduated cylinder made of glass, and the graduated cylinder is naturally dropped repeatedly ten times from the 50 mm-high position on a rubber sheet having a thickness of 10 mm. After that, the graduated cylinder is hit to a side of a wooden plate ten times from a 50 mm-distant position. Then, the above-mentioned operations are repeated two times. After that, the scale of the graduated cylinder is read to define the resultant value as the volume V (mL) of the granules. Different granules are dried at 110° C. for 3 hours, and then the weight M (g) of the resultant granules is measured. Based on them, the tap density is calculated from the expression M/V.

Note that the "tap density" of the titanium oxide granules that are used in the method of decomposing plastic and organic waste of the present invention is 1.00 g/mL to 1.80 g/mL, preferably 1.03 g/mL to 1.60 g/mL, more preferably 1.05 g/mL to 1.40 g/mL.

In addition, there is a "wear ratio" as still another indicator showing characteristics of the titanium oxide granules that are used in the method of decomposing plastic and organic waste of the present invention.

The wear ratio of the titanium oxide granules of the present invention can be measured by the following method.

The wear ratio is measured by the wear ratio measuring apparatus illustrated in FIG. 1. That is, the wear ratio measuring apparatus includes a sample container 201 having an inner diameter of 63 mm and a depth of 86 mm and a stirrer 202 fixed to the sample container, and the stirrer 202 includes a shaft 203 and three oval stirring blades 204 each having a length of 20 mm fixed to the lower end part of the shaft so as to extend at a 60° interval in the diameter direction from the shaft, with each of the stirring blades slanted so as to have an angle of 45° with respect to the horizontal plane. Each of the stirring blades is positioned so that the distance from its lowest edge to the bottom of the sample container is 8 mm.

Note that when the wear ratio of the titanium oxide granules is measured, 150 mL of the titanium oxide granules are weighed with a 200-mL graduated cylinder, and the resultant weight is recorded. After that, all the titanium oxide granules weighed are fed into the sample container and are stirred by using the stirrer described above at 300 rpm for 30 minutes. Then, the sample is taken out of the sample container and the whole is transferred onto a sieve having a mesh size of 0.5 mm. A sample passing through the sieve is weighed. Here, when the weight of the sample passing through the sieve having a mesh size of 0.5 mm is defined as W and the weight of the sample subjected to the measurement is defined as $W_0$, the wear ratio A of the sample subjected to the measurement is calculated according to $A=(W/W_0)\times 100(\%)$.

Note that the "wear ratio" of the titanium oxide granules that are used in the method of decomposing plastic and organic waste of the present invention is 2.0 wt % or less, preferably 1.5 wt % or less, more preferably 1.0 wt % or less.

In addition, there is a "specific surface area" as still another indicator showing characteristics of the titanium oxide granules that are used in the method of decomposing plastic and organic waste of the present invention.

The specific surface area of the titanium oxide granules of the present invention can be measured by the following method.

A BET method is used to carry out measurement in the present invention. A detailed description of the measurement is as follows.

The BET method is a method involving causing molecules whose adsorption occupancy area is known to adsorb onto the surfaces of powder particles at a temperature of liquid nitrogen and determining the specific surface area of a sample based on the adsorption amount.

In the present invention, used as a specific surface area measurement apparatus is a 2300-model automatic measurement apparatus (Shimadzu Corporation, manufacturer).

Note that the titanium oxide granules to be used in the method of decomposing plastic and organic waste of the present invention each have a "specific surface area" of 30 $m^2/g$ or more, preferably 33 $m^2/g$ to 65 $m^2/g$, more preferably 35 $m^2/g$ to 50 $m^2/g$.

Further, the specific surface area of a catalyst formed of the titanium oxide granules before use is 35 $m^2/g$ to 50 $m^2/g$.

This is because as the specific surface area is larger, the contact surfaces between the granules and plastic waste become larger, and hence decomposition efficiency can be enhanced. However, when the specific surface area is too large, the thermal resistance of the granules becomes weak and the granules are apt to decay and to turn to powder.

Further, in the "catalyst formed of the titanium oxide granules" of the present invention, the pore volume of titanium oxide as an active component is 0.05 ml/g to 0.70 ml/g, preferably 0.07 ml/g to 0.50 ml/g, more preferably 0.10 ml/g to 0.30 ml/g.

Note that any one of the known methods can be used as a method of measuring the pore volume of the catalyst formed of the titanium oxide granules. In the present invention, a mercury intrusion method is used for the measurement. Specific descriptions are as follows.

The mercury intrusion method is a method involving applying pressure so as to cause mercury to penetrate into pores of powders by taking advantage of the large surface tension of mercury and determining a pore volume based on the value of the pressure and the amount of mercury intruded.

In the present invention, a porosimeter (mercury intrusion type, the highest pressure: 200 MPa) manufactured by Thermo Finnigan Inc. was used.

As the "catalyst formed of the titanium oxide granules" of the present invention has the above-mentioned characteristics, the catalyst can decompose plastic and organic waste highly efficiently over a long time.

Further, the "catalyst formed of the titanium oxide granules" of the present invention has a narrower particle size distribution of titanium oxide granules than conventional titanium oxide catalysts. Thus, by using a sieve having a larger mesh size and a sieve having a smaller mesh size than the particle size distribution of the titanium oxide granules, the granules and foreign matter (metals, inorganic substances, and the like mixed with a plastic) can be easily separated.

In the "method of producing titanium oxide granules" of the present invention, a ground product of the above-mentioned inorganic oxide is stirred and granulated into sphere-like granules in the presence of at least one kind of sol selected from a titania sol, a silica sol, an alumina sol, and a zirconia sol, and the resultant granules are calcined at a temperature ranging from 400° C. to 850° C., followed by sieving, to thereby yield calcined granules each having a particle diameter ranging from 0.15 mm to 1.20 mm.

Note that the above-mentioned stirring granulation refers to, as known well, the granulation in which a powder (a powder of the inorganic oxide in the present invention) and a liquid binder (the above-mentioned sol in the present invention) are stirred, and then the aggregation of the powder due to the sol and a shearing effect due to high-speed stirring blades yield consolidated aggregates of the above-mentioned powder. Depending on the amount of a sol to be used, the rotation number of a stirring blade, a granulation time, and the like, the consolidation degree and size of the resultant aggregated granules can be arbitrarily adjusted. Further, by appropriately selecting a base plate in a granulation container in a stirring granulation apparatus, the shape of each of the resultant aggregates can be made closer to a sphere.

In the present invention, a granulator for stirring and granulating the inorganic oxide is not particularly limited. For example, preferably used are a mixer granulator NMG series manufactured by Nara Machinery Co., Ltd., a high-speed mixer and HIGH FLEX GRAL manufactured by Fukae Powtec Co., Ltd., an Eirich intensive mixer (an Eirich reverse-flow type high-speed mixer) manufactured by Nippon Eirich Co., Ltd., a high-speed stirring granulator HSG series manufactured by G-Labo, Inc., a kneader/high-speed stirring granulator SPG series and a high-speed mixer/grinder spartan granulator manufactured by Dalton Co., Ltd., a vertical granulator VG-CT series manufactured by Powrex Corporation, and the like.

The inorganic oxide is stirred and granulated in the presence of the sol. In order to further enhance the sphericalness of the resultant granules and also to make the particle size distribution of the granules more precise, the granules obtained by the stirring granulation may be additionally granulated in the presence of the sol by at least one kind of method selected from tumbling granulation and fluidized-bed granulation.

In the granulation, in order to make the resultant granules harder and further enhance the wear resistance of the granules, a mixture of a ground product of the inorganic oxide and a ground product obtained by drying and calcining the sol, followed by pulverization may be used together with the sol.

The tumbling granulation refers to, as already known well, a granulation method involving giving a tumbling motion to a mixture of a powder and a liquid binder, to thereby yield aggregated granules. The fluidized-bed granulation refers to, as also already known well, a granulation method involving supplying a liquid binder into a fluidized bed of a powder and causing the formation of bridges between particles owing to the binder, to thereby yield aggregated granules.

As mentioned above, the inorganic oxide is stirred and granulated, the resultant granules are further granulated by at least one kind of method selected from the tumbling granulation and the fluidized-bed granulation, and then the granules obtained are, as described above, calcined at a temperature ranging from 400° C. to 850° C., followed by sieving, to thereby collect particles each having a particle diameter ranging from 0.1 mm to 1.2 mm. As a result, granules having necessary particle size can be obtained as a catalyst according to the present invention.

A tumbling granulator and a fluidized-bed granulator (a combined granulator) for the granulation mentioned above are not particularly limited as well in the present invention. Examples of those granulators include a fluidized-bed granulation apparatus "NEW/MARUMERIZER" and a spheronizer "MARUMERIZER" manufactured by Dalton Co., Ltd., and a fluidized-bed granulation apparatus and a tumbling/fluidizing coating apparatus "Multiplex" series manufactured by Powrex Corporation.

Any known decomposition apparatus may be used as a decomposition apparatus for plastic and organic waste that is used in the method of decomposing plastic and organic waste of the present invention. However, the titanium oxide granules that are used in the method of decomposing plastic and organic waste of the present invention exhibit very high decomposition efficiency. Thus, it is preferred to use a catalyst-circulating decomposition apparatus for plastic and organic waste, the apparatus being high in efficiency in the contact of the granules with plastic and organic waste, rather than conventional batch-type decomposition apparatuses.

Note that the catalyst-circulating decomposition apparatus for plastic and organic waste is described in WO 2007/122967 A1.

Besides, the above-mentioned decomposition apparatus for plastic and organic waste includes oxidation catalyst treatment means and/or reduction catalyst treatment means in addition to the above-mentioned means for treating plastic and organic waste, and further include preferably lime neutralization treatment means.

Further, the decomposition apparatus that is used in the decomposition method of the present invention may have one or more kinds of means selected from any of the following:
(1) alumina catalyst treatment means;
(2) means for grinding plastic and organic waste;
(3) carrier gas supply means;
(4) means for collecting scattered metals, inorganic substances, and/or catalysts discharged from a reaction tank for means for treating plastic and organic waste;
(5) cyclone dust collection means (first dust collection means);
(6) dust collection means with a bag filter (second dust collection means);
(7) heat exchange means;
(8) preheater means;
(9) exhaust blower means;
(10) cooling means;
(11) heat recovery means;
(12) HCl continuous measurement means;
(13) CO continuous measurement means;
(14) alarm means; and
(15) oxidation catalyst treatment means and/or reduction catalyst treatment means.

The "decomposition system for plastic and organic waste" of the present invention means carrying out the decomposition of plastic and organic waste by using any one of the decomposition apparatuses described above and by further using the titanium oxide granules having the optimal particle characteristics of the present invention.

Further, in the decomposition method or decomposition system for plastic and organic waste of the present invention, for example, when the plastic waste to be treated is various medical plastic waste such as polyvinyl chloride, polyurethane, and Teflon (registered trademark), hydrogen chloride, sulfur compounds, hydrogen fluoride, a cyan gas, and nitrogen-containing compounds are generated in the treatment process. Hydrogen chloride and the like cannot be emitted into the atmosphere as they are. Therefore, the lime neutralization treatment means is preferably introduced.

The rotation number of the stirring of a catalyst formed of the titanium oxide granules and plastic waste is 5 rpm to 70 rpm, preferably 10 rpm to 40 rpm, though the rotation number varies depending on the volume of a reaction container, the shape of a stirring blade, and a stirring method. Note that regardless of whether the reaction container adopts a batch system or a circulation system, the same rotation number is preferred.

Those values are ones set by considering the fact that when the rotation number is too large, titanium oxide wears to a large extent, but when the rotation number is small, the efficiency in the contact of titanium oxide with plastic and/or organic waste becomes lower.

The plastic and organic waste applicable to the decomposition method or decomposition system of the present invention is not particularly limited. In addition to the general-purpose thermoplastic plastics such as polyethylene and polypropylene, thermosetting plastics can be decomposed and gasified by the method of the present invention. Although the plastic and organic waste are preferably crushed to several cubic millimeters in view of decomposition efficiency, the waste may also be subjected to the decomposition treatment without crushing.

Note that objects which can be decomposed by the method of decomposing plastic and organic waste of the present invention, including organic substances, are not particularly limited, and examples of the objects include: plastics such as polyethylene, polypropylene, polyester, polyethylene terephthalate, polystyrene, polycarbonate, polyurethane, polyvinyl chloride, and Teflon (registered trademark); diapers; artificial dialyzers; anticancer drugs; treated articles relating to gene research; treated articles of bacteria and microorganisms; information-relating device terminals; confidential information-relating devices (such as a CD-R); oils (such as a silicon oil); plastic waste generated from automobiles and household electric appliances; valuable metal recovery; and separation of organic substances from metals and inorganic substances. Further, in the case of medical waste, metals such as stainless steel and aluminum may be mixed with the waste, or a metal may be deposited from the vapor onto or adhere to the surface of the waste depending on the use of the medical waste. Further, the plastic waste is not limited to used plastics, but also refers to unused but unnecessary plastics and organic substances.

The present invention is described below with reference to examples, but the present invention is by no means limited thereto.

EXAMPLES

Example 1

Production of Titanium Oxide Granules that are Used in Method of Decomposing Plastic and Organic Waste of the Present Invention Titanium oxide to be used in the present invention was produced by the plurality of methods described below. The details of the methods are as described below.

(1) Titanium Oxide Granule 1

In a titanium oxide production process using a sulfuric acid method, a slurry of titanium hydroxide obtained through a hydrolysis step was filtrated and washed with water, followed by repulping, to thereby yield Slurry A. Nitric acid was added as a solating agent to Slurry A, yielding Sol B of titanium oxide. Further, part of Sol B was heated to 100° C. and dried, producing a dried gel. The dried gel was calcined at 500° C. for 3 hours in an electrical furnace, yielding Calcined titanium oxide C.

Calcined titanium oxide C was ground and the resultant ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3000 rpm for a high-speed chopper, to thereby yield titanium oxide particles.

The titanium oxide particles were dried at 100° C. for 3 hours and were then calcined at 600° C., followed by sieving with a sieve having a mesh size of 1.19 mm and a sieve having a mesh size of 0.104 mm, to thereby yield granules each having a particle diameter of 0.1 mm to 1.2 mm. The weight of the granules was defined as 100 wt %.

Note that, in the present invention, the phrase "granules each having a particle diameter of 0.1 mm to 1.2 mm" refers to the granules which were obtained by sieving granules by using a standard 15-mesh sieve made of stainless steel wire mesh (wire diameter: 0.5 mm, mesh size: 1.19 mm) and a 150-mesh sieve made of stainless steel wire mesh (wire diameter: 0.065 mm, mesh size: 0.104 mm), that is, granules passing through the 15-mesh sieve and remaining on the 150-mesh sieve.

Specifically, the granules each having a particle diameter of 0.1 mm to 1.2 mm were obtained in the following manner. That is, the above-mentioned 15-mesh standard sieve was fixed to the upper lid of a Ro-Tap standard sieve shaker manufactured by Yoshida Seisakusho Co., Ltd. and the above-mentioned 150-mesh standard sieve was fixed to the lower tray of the sieve shaker. Then, 100 g of titanium oxide granules were supplied as a sample on the 15-mesh standard sieve, and were subjected to sieving for 3 minutes with shaking rotation at 300 rpm and the number of striking at 150 times/minute, thereby yielding granules passing through the 15-mesh sieve and remaining on the 150-mesh sieve as the granules each having a particle diameter of 0.1 mm to 1.2 mm.

The resultant titanium oxide granules described above each had a BET specific surface area of 60 $m^2/g$, a pore volume of 0.15 mL/g measured by a mercury intrusion method, a tap density of 1.16 g/mL, and a wear ratio of 0.3%.

(2) Titanium Oxide Granule 2

Slurry A of titanium hydroxide obtained in Example 1 was heated at 100° C. and dried, producing a dried gel. The dried gel was calcined at 500° C. for 3 hours in an electrical furnace and was then subjected to grinding treatment, yielding a ground product of Calcined titanium oxide D. The ground product of Calcined titanium oxide D at 50 parts by weight and the ground product of Calcined titanium oxide C at 50 parts by weight were mixed.

The mixture of the ground product of Calcined titanium oxide D at 50 parts by weight and the ground product of Calcined titanium oxide C at 50 parts by weight was treated in the same manner as that in Example 1. The resultant particles were dried, calcined, and sieved, yielding granules each having a particle diameter of 0.1 mm to 1.2 mm.

The resultant titanium oxide granules described above each had a specific surface area of 62 $m^2/g$, a pore volume of 0.28 mL/g, a tap density of 1.06 g/mL, and a wear ratio of 1.0%.

(3) Titanium Oxide Granule 3

The titanium oxide granules obtained in Example 1 were further granulated so as to each have a more spherical shape by spraying the ground product of Titanium oxide C obtained in Example 1 and a 4-fold dilution of Sol B diluted with water by using a tumbling granulator "MARUMERIZER." The resultant particles were subjected to the same treatment as that in Example 1, yielding granules each having a particle diameter ranging from 0.1 mm to 1.2 mm.

The resultant titanium oxide granules described above each had a specific surface area of 59 $m^2/g$, a pore volume of 0.17 mL/g, a tap density of 1.18 g/mL, and a wear ratio of 0.3%.

(4) Titanium Oxide Granule 4

Sol B of titanium oxide obtained in Example 1 and ammonium tungstate were mixed. The mixture was heated at 100° C. and dried, producing a dried gel. The dried gel was calcined at 500° C. for 3 hours in an electrical furnace, yielding a calcined titanium-tungsten composite oxide (weight ratio of titanium oxide to tungsten oxide: 90:10).

Calcined titanium-tungsten composite oxide E was ground, producing a ground product. The ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3000 rpm for a high-speed chopper, to thereby yield titanium-tungsten composite oxide granules.

Next, the granules were further granulated so as to each have a more spherical shape by spraying the ground product of Calcined titanium-tungsten composite oxide E and a 4-fold dilution of Sol B diluted with water by using a spheronizer "MARUMERIZER." The resultant granules were subjected to the same treatment as that in Example 1, yielding granules each having a particle diameter of 0.1 mm to 1.2 mm.

The resultant titanium oxide granules described above each had a specific surface area of 69 $m^2/g$, a pore volume of 0.2 ml/g, a tap density of 1.20 g/ml, and a wear ratio of 0.5%.

Production of Conventional Titanium Oxide Granules

The same process as that in Example 1 was carried out, yielding titanium oxide granules (Control 1) each having a particle diameter of 1.2 mm or more. Further, the same process as that in Example 1 was carried out, yielding titanium oxide granules (Control 2) each having a particle diameter of 0.1 mm or less.

Example 2

Measurement of Particle Diameter and Circularity of Titanium Oxide Granule

The particle diameters and circularities of the two fractions (an L fraction and an M fraction) of titanium oxide granules obtained in Example 1 were measured. The details of the measurement are as follows.

A CCD camera was fixed to an inverted microscope, and the processing of images was performed with Image-Pro Plus. Specifically, titanium oxide granules were placed in a 3-cm plastic petri dish so that the granules did not overlap with each other, images were taken into the inverted microscope described below at a magnification of four times, and the longest radius, shortest radius, and circularity of each granule was automatically measured by using Image-Pro Plus.

Microscope: inverted microscope TMD-300 Nikon Corporation

CCD camera: Nippon Roper K. K., Retiga 2000R (1600×1200 pixels)

Image processing apparatus: Nippon Roper K. K., Image-Pro Plus

Figure 2:
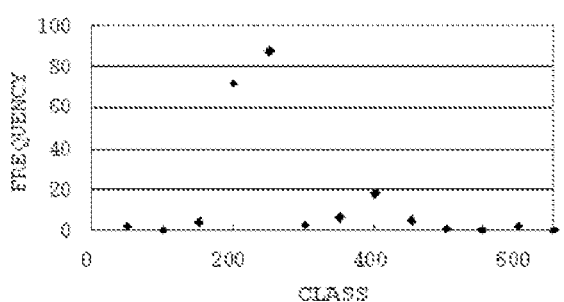
FIGS. 2A, 2B, and 2C illustrate measurement results of the particle radius and circularity of an M fraction.
Figure 2:
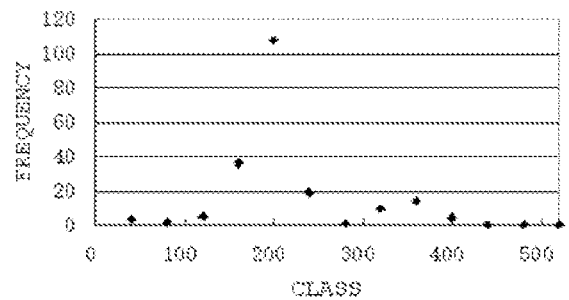
Figure 2:
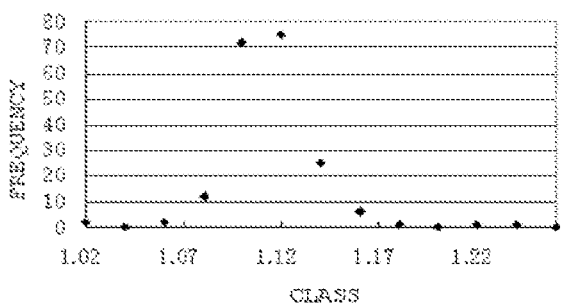
Figure 3:
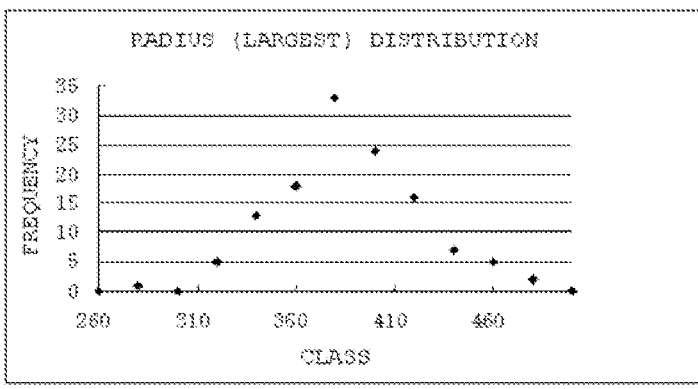
FIGS. 3A, 3B, and 3C illustrate measurement results of the particle radius and circularity of an L fraction.
Figure 3:
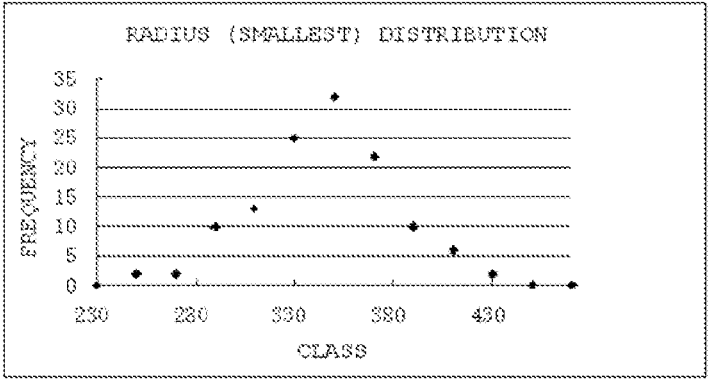
Figure 3:
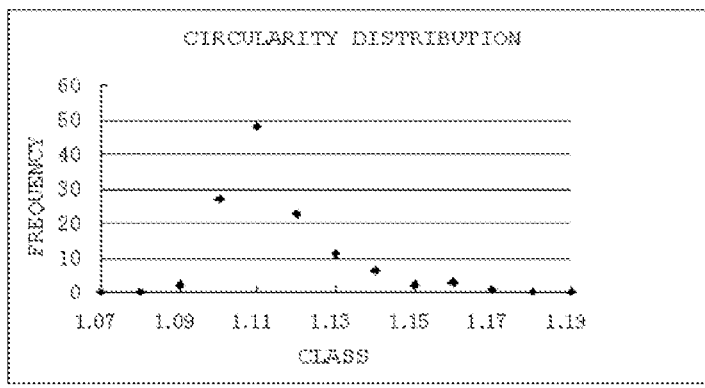
Figure 4:
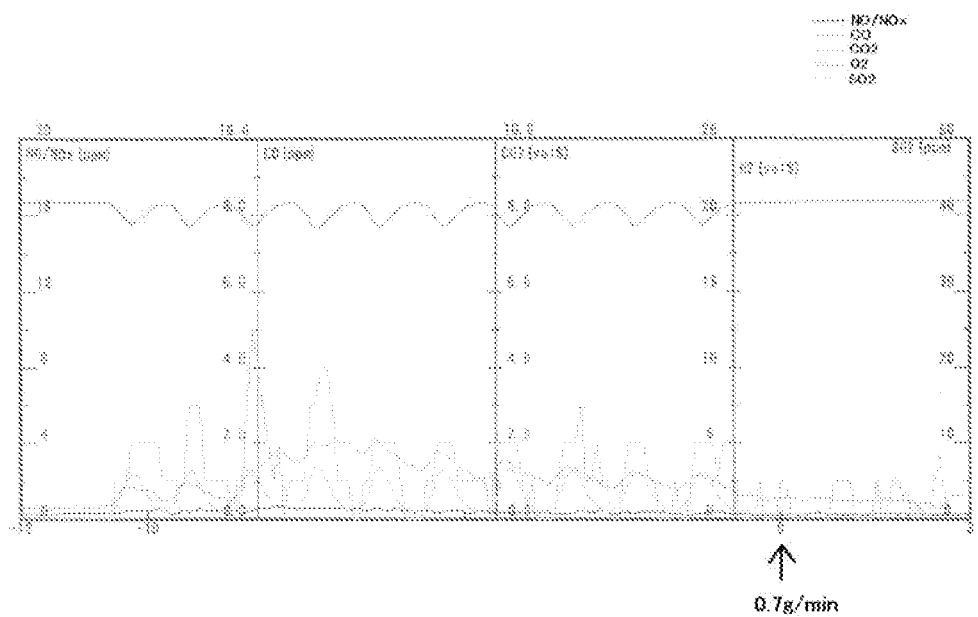
FIG. 4 illustrates results of Titanium oxide granules 1 obtained by feeding polyethylene pellets at 0.7 g/min.
Figure 5:
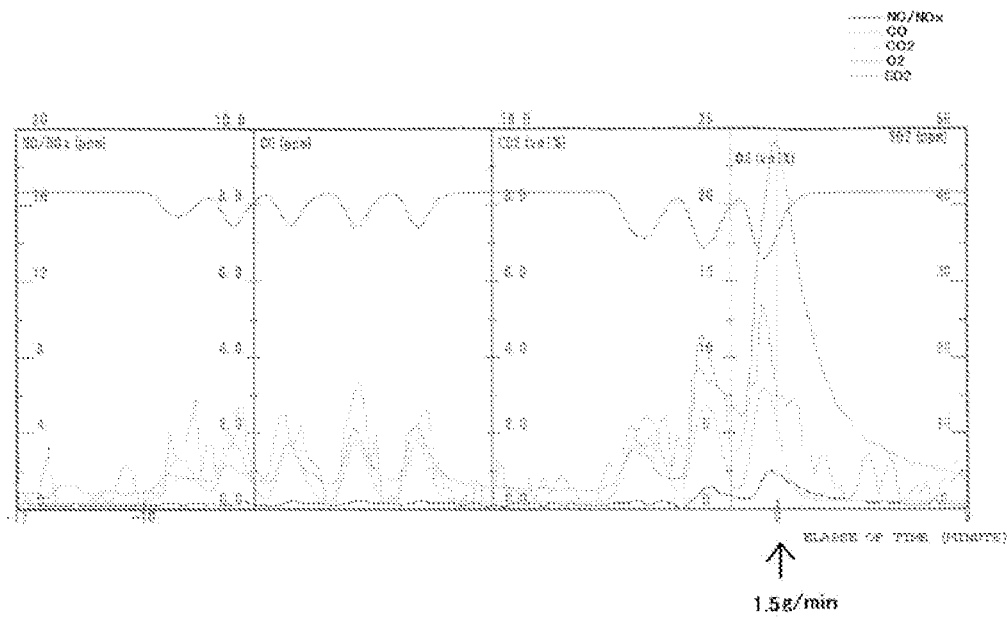
FIG. 5 illustrates results of Titanium oxide granules 1 obtained by feeding polyethylene pellets at 1.5 g/min.
Figure 6:
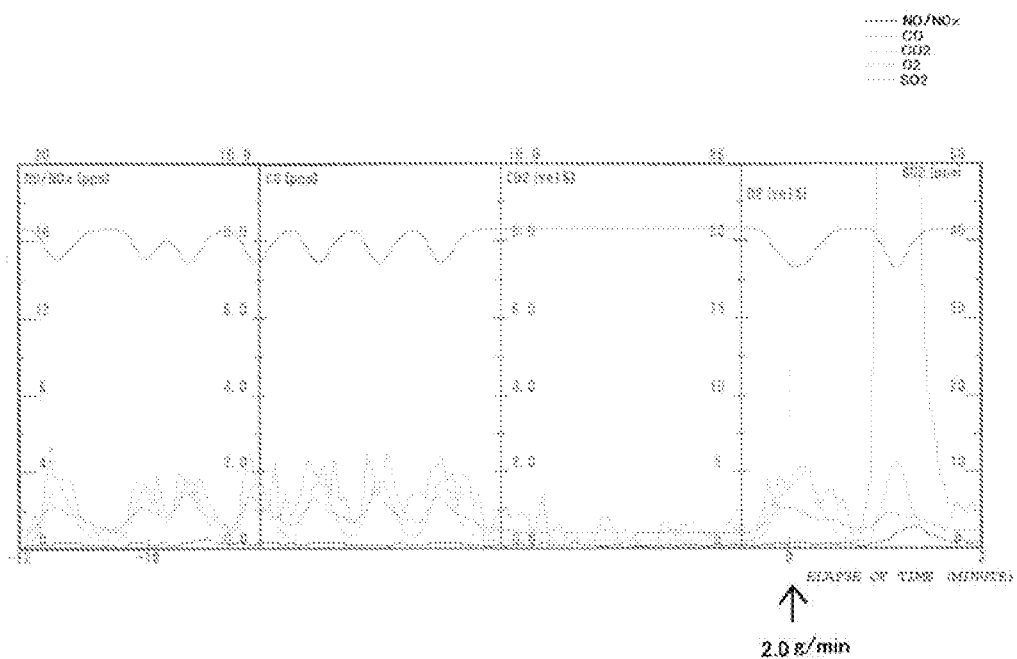
FIG. 6 illustrates results of Titanium oxide granules 1 obtained by feeding polyethylene pellets at 2.0 g/min.
Figure 7:
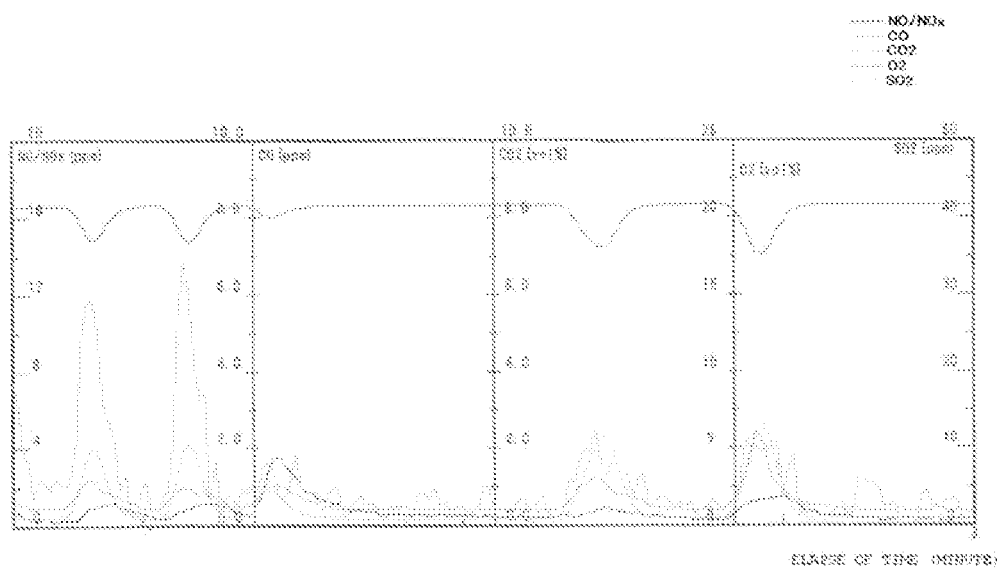
FIG. 7 illustrates results of Titanium oxide granules 1 obtained by feeding polyethylene pellets at 2.0 g/min.

The results of the above-mentioned particle diameters are illustrated in FIGS. 2A and 2B (M fraction) and FIGS. 3A and 3B (L fraction).

The radius of the particles of the M fraction ranged from 0.05 mm to 0.6 mm (FIGS. 2A and 2B). The radius of the particles of the L fraction ranged from 0.25 mm to 0.48 mm (FIGS. 3A and 3B).

Thus, granules each having a particle diameter (two times the radius) in the range of 0.2 mm to 1.0 mm, and, more strictly, in the range of 0.3 mm to 1.0 mm accounted for 70% or more of all titanium oxide granules.

The results of the above-mentioned circularities are illustrated in FIG. 2C (M fraction) and FIG. 3C (L fraction).

The circularity of the M fraction ranged from 1.02 to 1.24 (FIG. 2C). The circularity of the L fraction ranged from 1.09 to 1.17 (FIG. 3C).

Thus, granules each having a circularity in the range of 1.00 to 1.50, and, more strictly, in the range of 1.00 to 1.30 accounted for 70% or more of all titanium oxide granules.

Example 3

Measurement of Slant Angle for Rolling of Titanium Oxide Granules that are Used in Method of Decomposing Plastic and Organic Waste of the Present Invention The slant angle for rolling of each of the two fractions (an L fraction and an M fraction) of the titanium oxide granules obtained in Example 1 was measured. The details of the measurement are as follows.

Note that there were used as controls a titanium oxide catalyst (Sakai Chemical Industry Co., Ltd., SSP-G Lot. 051108) and titanium oxide having a smaller particle diameter (having a particle diameter of 0.1 mm or less).

20 g of titanium oxide granules were placed on a glass plate, and the angle of the glass plate was changed from horizontal (0°) to slanted, to thereby measure (1) the angle at which a titanium oxide granule first started sliding and (2) the angle at which all the titanium oxide granules finished sliding.

The results of the measurement described above are shown in Table 1 described below.

The angle at which a granule of each of the two fractions (the L fraction and the M fraction) of the titanium oxide granules obtained in Example 1 first started sliding was 1.5° to 2.5°.

On the other hand, the angle at which all granules of each of the two fractions (the L fraction and the M fraction) of the titanium oxide granules obtained in Example 1 finished sliding was 9.0° to 10.0°.

The slant angle for rolling of the granules of each of the two fractions (the L fraction and the M fraction) of the titanium oxide granules obtained in Example 1 was smaller, compared with that of each control.

Titanium oxide granules 1 obtained in Example 1 (M fraction)
Conventional titanium oxide catalyst (Sakai Chemical Industry Co., Ltd., SSP-G Lot. 051108)
Control 1 obtained in Example 1
Control 2 obtained in Example 1
5. Plastic waste: polyethylene pellet
6. Feed amount: 0.7 g/min, 1.2 g/min, 1.5 g/min, 2.0 g/min Note that a continuous measurement device for gas concentration PG-250 (manufacturer: HORIBA, Ltd.) was used to measure gas concentrations ($NO/NO_x$, $CO$, $CO_2$, $O_2$, and $SO_2$).

Results of Titanium Oxide Granules 1

FIGS. 4 to 7 illustrate the results of the treatment capability of Titanium oxide granules 1.

When polyethylene pellets were fed at 0.7 g/min (FIG. 4), each gas concentration ($NO/NO_x$, $CO$, $CO_2$, $O_2$, and $SO_2$) did not change. Further, it was confirmed that all the polyethylene pellets fed were decomposed.

Immediately after polyethylene pellets were fed at 1.5 g/min (FIG. 5), CO concentration and $SO_2$ concentration slightly rose, but the CO concentration and the $SO_2$ concentration immediately lowered. Further, it was confirmed that all the polyethylene pellets fed were decomposed.

When polyethylene pellets were fed at 2.0 g/min (FIGS. 6 and 7), CO concentration rose, but the CO concentration immediately lowered. Further, it was confirmed that all the polyethylene pellets fed were decomposed.

Note that the amount of the titanium oxide granules in the reaction container did not change.

The results described above show that Titanium oxide granules 1 can decompose plastic waste at 2.0 g or more per minute under the conditions defined in this example.

TABLE 1

|  | M fraction | L fraction | Unused commercially available product | Used commercially available product | Titanium oxide having a smaller particle diameter |
|---|---|---|---|---|---|
| Angle at which a granule first starts sliding | 2.0 to 2.5° | 1.5 to 2.0° | 25° | 20° | 25° |
| Angle at which all granules finish sliding | 15.0 to 16.0° | 9.0 to 10.0° | 45° | 40° | 29° |

Example 4

Confirmation of Treatment Capability of Titanium Oxide Granules that are Used in Method of Decomposing Plastic and Organic Waste of the Present Invention The treatment capability of the titanium oxide granules that are used in the method of decomposing plastic and organic waste, the method being used in the present invention, was compared with that of conventional titanium oxide and the like. Each condition and an apparatus used are as described below.

Figure 8:
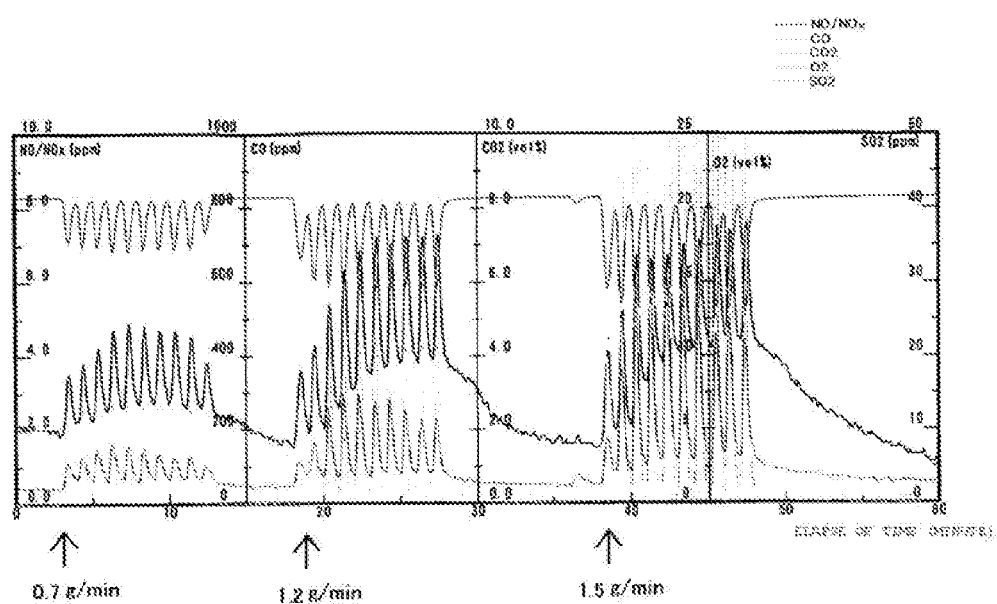
FIG. 8 illustrates results of a conventional titanium oxide catalyst.

1. Experimental apparatus (reaction container): stirrer-type decomposition experimental apparatus (2200 mL)
2. Injected air flow rate: 50 L/min
3. Temperature in reaction container: 450° C. to 550° C.
4. Used catalyst: 700 g Results of Conventional Titanium Oxide Catalyst FIG. 8 illustrates the results of the conventional titanium oxide catalyst.

When polyethylene pellets were fed at 0.7 g/min, CO concentration rose to about 500 ppm. Besides, the CO concentration did not decrease after time elapsed.

When polyethylene pellets were fed at 1.2 g/min, CO concentration rose to about 700 ppm. Besides, the CO concentration did not decrease after time elapsed. In addition, $SO_2$ concentration rose to about 15 ppm.

When polyethylene pellets were fed at 1.5 g/min, CO concentration exceeded 1000 ppm. Besides, the CO concentration did not decrease after time elapsed. In addition, $SO_2$ concentration rose to about 40 ppm.

Besides, after the above-mentioned measurements, polyethylene pellets remained in the reaction container.

The results described above show that the conventional titanium oxide catalyst was not able to decompose plastic waste at 0.7 g per minute under the conditions defined in this example.

Results of Control 1 Obtained in Example 1

Control 1 obtained in Example 1 was not able to decompose plastic waste at 0.7 g per minute as in the above-mentioned results of the conventional titanium oxide catalyst.

Results of Control 2 Obtained in Example 1

Control 2 obtained in Example 1 was not able to decompose plastic waste at 0.7 g per minute as in the above-mentioned results of the conventional titanium oxide catalyst.

Besides, the amount of titanium oxide granules in the reaction container decreased by about 20 percent because of their scattering.

From the foregoing, it was found that the treatment capability of the titanium oxide granules that were used in the method of decomposing plastic and organic waste of the present invention was about three times or more the treatment capability of the conventional catalyst.

Example 5

Confirmation of Separation Capability of Titanium Oxide Granules that are Used in Method of Decomposing Plastic and Organic Waste of the Present Invention from Foreign Matter The separation capability of the titanium oxide granules that are used in the method of decomposing plastic and organic waste from foreign matter, the method being used in the present invention, was compared with that of conventional titanium oxide and the like. The details are as described below.

The above-mentioned titanium oxide granules of Example 1 and foreign matter (simulated waste: iron wire) were mixed. After that, by using a sieve having a larger mesh size and a sieve having a smaller mesh size than the particle size distribution of the titanium oxide granules, the foreign matter was collected from the mixture of the titanium oxide granules and the foreign matter.

The same treatment was also carried out by using conventional titanium oxide.

The case where the titanium oxide granules of the present invention were used clearly exhibited higher efficiency in collecting foreign matter, compared with the case where the conventional titanium oxide was used.

The foregoing shows that the titanium oxide granules that are used in the method of decomposing plastic and organic waste of the present invention can easily separate themselves from foreign matter, compared with the conventional titanium oxide catalyst.

In addition, all the examples of the present invention described above may be carried out in modes after the application of varieties of improvements, modifications, and changes on the basis of the knowledge of the persons skilled in the art within a range not to depart from the scope of the present invention.

INDUSTRIAL APPLICABILITY

The decomposition method of the present invention, the method using the titanium oxide granules having the optimal particle characteristics, can provide a several times higher capability of treating plastic and organic waste, compared with decomposition methods using conventional titanium oxide.

| Reference Signs List | |
|---|---|
| 201: | sample container |
| 202: | stirrer |
| 203: | shaft |
| 204: | stirring blade |

The invention claimed is:

1. A method of decomposing plastic and organic waste involving converting plastic and/or organic waste to gas, the method comprising the step of stirring while heating the plastic and/or organic waste in a range of 420° C. to 560° C. together with a catalyst formed of titanium oxide granules containing titanium oxide as an active component, wherein the catalyst has the following characteristics:
   (1) the granules each have a substantially spherical shape; and
   (2) granules each having a particle diameter of 0.2 mm to 1.0 mm account for 70% or more of all the granules.

2. A method of decomposing plastic and organic waste according to claim 1, wherein granules each having a particle diameter of 0.3 mm to 1.0 mm account for 70% or more of all the granules.

3. A method of decomposing plastic and organic waste according to claim 1, wherein the phrase "the granules each have a substantially spherical shape" comprises the following characteristics:
   (1) an angle at which a granule first starts sliding is 0.5° to 15.0°; and
   (2) an angle at which all the granules finish sliding is 2.0° to 30.0°.

4. A method of decomposing plastic and organic waste according to claim 1, wherein the granules each have a tap density in a range of 1.05 g/mL to 1.4 g/mL.

5. A method of decomposing plastic and organic waste according to claim 1, wherein the granules each have a specific surface area in a range of 35 $m^2$/g to 50 $m^2$/g.

* * * * *